(12) United States Patent
Feder et al.

(10) Patent No.: US 10,810,781 B2
(45) Date of Patent: Oct. 20, 2020

(54) SYSTEMS AND METHODS FOR DISPLAYING REPRESENTATIVE IMAGES

(71) Applicant: Duelight LLC, Sunnyvale, CA (US)

(72) Inventors: Adam Barry Feder, Mountain View, CA (US); Brian J. Kindle, Sunnyvale, CA (US); William Guie Rivard, Menlo Park, CA (US)

(73) Assignee: DUELIGHT LLC, Sunnyvale, CA (US)

(*) Notice: Subject to any disclaimer, the term of this patent is extended or adjusted under 35 U.S.C. 154(b) by 0 days.

(21) Appl. No.: 16/147,206

(22) Filed: Sep. 28, 2018

(65) Prior Publication Data

US 2019/0035135 A1 Jan. 31, 2019

Related U.S. Application Data

(63) Continuation of application No. 15/622,520, filed on Jun. 14, 2017, now Pat. No. 10,109,098, which is a
(Continued)

(51) Int. Cl.
*G06T 13/80* (2011.01)
*G06F 3/0484* (2013.01)
(Continued)

(52) U.S. Cl.
CPC ............ *G06T 13/80* (2013.01); *G06F 3/0346* (2013.01); *G06F 3/0484* (2013.01); *G06T 3/60* (2013.01); *G09G 5/37* (2013.01); *G06F 3/0482* (2013.01); *G06F 3/0485* (2013.01); *G06F 2200/1614* (2013.01); *G06F 2200/1637* (2013.01); *G06T 1/20* (2013.01); *G09G 2340/0492* (2013.01)

(58) Field of Classification Search
CPC ... G06T 13/80; G06T 3/60; G06T 1/20; G06F 3/0346; G06F 3/0484; G06F 3/0482; G06F 3/0485; G06F 2200/1614; G06F 2200/1637; G09G 5/37; G09G 2340/0492
See application file for complete search history.

(56) References Cited

U.S. PATENT DOCUMENTS 5,734,760 A * 3/1998 Yoshida ............... G06T 3/60
358/1.18
5,835,639 A 11/1998 Honsinger et al.
(Continued)

OTHER PUBLICATIONS

Rivard et al., U.S. Appl. No. 16/518,786, filed Jul. 22, 2019.
(Continued)

*Primary Examiner* — Charles L Beard
(74) *Attorney, Agent, or Firm* — Zilka-Kotab, P.C.

(57) ABSTRACT

A system, method, and computer program product for displaying representative images within a collection viewer is disclosed. The method comprises receiving an indication of a new orientation for the collection viewer, displaying a sequence of animation frames that depict an in-place rotation animation for the representative images, generating a rotation angle in a sequence of rotation angles, and displaying a rendered representative image for each of the two or more representative images by rendering the two or more representative images, wherein each rendered representative image is rotated according to the rotation angle.

20 Claims, 7 Drawing Sheets

Related U.S. Application Data continuation of application No. 14/340,557, filed on Jul. 24, 2014, now Pat. No. 9,741,150.

(60) Provisional application No. 61/958,324, filed on Jul. 25, 2013.

(51) Int. Cl.
| | |
|---|---|
| *G06F 3/0346* | (2013.01) |
| *G06T 3/60* | (2006.01) |
| *G09G 5/37* | (2006.01) |
| *G06T 1/20* | (2006.01) |
| *G06F 3/0482* | (2013.01) |
| *G06F 3/0485* | (2013.01) |

(56) References Cited

U.S. PATENT DOCUMENTS

| | | | |
|---|---|---|---|
| 5,900,909 A | 5/1999 | Parulski et al. | |
| 5,986,668 A | 11/1999 | Szeliski et al. | |
| 5,987,164 A | 11/1999 | Szeliski et al. | |
| 6,055,326 A * | 4/2000 | Chang | G06T 7/73 |
| | | | 378/20 |
| 6,061,696 A | 5/2000 | Lee et al. | |
| 6,115,025 A | 9/2000 | Buxton et al. | |
| 6,137,468 A * | 10/2000 | Martinez | G06F 1/1616 |
| | | | 345/649 |
| 6,326,978 B1 | 12/2001 | Robbins | |
| 6,704,007 B1 | 3/2004 | Clapper | |
| 6,842,265 B1 | 1/2005 | Votipka et al. | |
| 7,027,054 B1 | 4/2006 | Cheiky et al. | |
| 7,030,868 B2 | 4/2006 | Clapper | |
| 7,030,912 B1 | 4/2006 | Honma | |
| 7,085,590 B2 | 8/2006 | Kennedy et al. | |
| 7,352,361 B2 | 4/2008 | Yi | |
| 7,626,598 B2 | 12/2009 | Manchester | |
| 7,646,417 B2 | 1/2010 | Goto et al. | |
| 7,730,422 B2 | 6/2010 | Russo | |
| 7,903,115 B2 | 3/2011 | Platzer et al. | |
| 7,978,182 B2 * | 7/2011 | Ording | G06F 1/1626 |
| | | | 345/173 |
| 8,068,121 B2 | 11/2011 | Williamson et al. | |
| 8,120,625 B2 * | 2/2012 | Hinckley | G06F 1/1626 |
| | | | 345/659 |
| 8,125,499 B2 | 2/2012 | Yamada | |
| 8,217,964 B2 * | 7/2012 | Laine | G06F 1/1626 |
| | | | 345/659 |
| 8,233,003 B2 | 7/2012 | Obinata | |
| 8,314,817 B2 | 11/2012 | Williamson et al. | |
| 8,363,145 B2 * | 1/2013 | Iwamoto | H04N 5/23219 |
| | | | 348/333.11 |
| 8,412,277 B2 * | 4/2013 | Fujiwara | G01V 7/04 |
| | | | 455/550.1 |
| 8,451,296 B2 * | 5/2013 | Ono | G11B 27/105 |
| | | | 345/619 |
| 8,531,465 B2 | 9/2013 | Platzer et al. | |
| 8,543,946 B2 * | 9/2013 | Kethireddy | G06F 3/0481 |
| | | | 345/157 |
| 8,581,935 B2 | 11/2013 | Handa | |
| 8,610,724 B2 | 12/2013 | Garg | |
| 8,692,851 B2 | 4/2014 | Ording et al. | |
| 8,717,293 B2 | 5/2014 | Wong et al. | |
| 8,817,048 B2 | 8/2014 | Kerr et al. | |
| 8,830,177 B2 * | 9/2014 | Woo | G09G 5/00 |
| | | | 345/169 |
| 8,830,261 B2 * | 9/2014 | Asai | G06F 40/106 |
| | | | 345/619 |
| 8,854,325 B2 * | 10/2014 | Byrd | G06F 3/04883 |
| | | | 178/18.01 |
| 8,872,855 B2 | 10/2014 | Doll | |
| 8,890,897 B2 * | 11/2014 | Homma | G06F 1/1694 |
| | | | 345/659 |
| 8,896,632 B2 | 11/2014 | MacDougall et al. | |
| 8,915,437 B2 | 12/2014 | Hoshino et al. | |
| 8,933,960 B2 | 1/2015 | Lindahl et al. | |
| 8,937,735 B2 | 1/2015 | Mori | |
| 8,947,382 B2 | 2/2015 | Winkler et al. | |
| 8,988,349 B2 | 3/2015 | Alberth et al. | |
| 9,015,640 B2 * | 4/2015 | de Leon | G06F 3/017 |
| | | | 715/863 |
| 9,070,229 B2 | 6/2015 | Williamson et al. | |
| 9,098,069 B2 | 8/2015 | Dickinson et al. | |
| 9,129,550 B2 | 9/2015 | Doll | |
| 9,144,714 B2 | 9/2015 | Hollinger | |
| 9,158,492 B2 | 10/2015 | Miyata | |
| 9,165,533 B2 * | 10/2015 | Paulson | G09G 5/32 |
| 9,177,362 B2 * | 11/2015 | Restrepo | G06T 3/606 |
| 9,189,069 B2 | 11/2015 | Hinckley | |
| 9,196,076 B1 | 11/2015 | MacLeod | |
| 9,215,405 B2 | 12/2015 | Atkinson | |
| 9,232,124 B2 | 1/2016 | Song | |
| 9,256,974 B1 | 2/2016 | Hines | |
| 9,261,909 B2 | 2/2016 | Lam | |
| 9,298,745 B2 | 3/2016 | Lee et al. | |
| 9,342,138 B2 * | 5/2016 | Ding | G06F 3/0487 |
| 9,383,202 B2 | 7/2016 | Zhou et al. | |
| 9,417,836 B2 * | 8/2016 | Postal | G06F 3/1446 |
| 9,424,798 B2 * | 8/2016 | Park | G09G 5/00 |
| 9,459,781 B2 | 10/2016 | Wilson et al. | |
| 9,478,012 B2 * | 10/2016 | Uratani | G06T 3/606 |
| 9,489,927 B2 * | 11/2016 | Aizawa | G09G 5/38 |
| 9,495,025 B2 * | 11/2016 | Ishikawa | G06F 3/041 |
| 9,507,379 B2 * | 11/2016 | Kamei | G06F 1/1637 |
| 9,507,445 B2 | 11/2016 | Sutton et al. | |
| 9,552,076 B2 * | 1/2017 | Homma | G06F 3/02 |
| 9,560,269 B2 | 1/2017 | Baldwin | |
| 9,591,225 B2 | 3/2017 | Jung et al. | |
| 9,628,647 B2 | 4/2017 | Tomono et al. | |
| 9,646,576 B2 * | 5/2017 | Masuko | G06F 1/1686 |
| 9,684,434 B2 | 6/2017 | Lewin et al. | |
| 9,721,375 B1 * | 8/2017 | Rivard | G06F 3/0484 |
| 9,741,150 B2 * | 8/2017 | Feder | G09G 5/37 |
| 9,761,033 B2 | 9/2017 | Flider | |
| 9,779,481 B2 * | 10/2017 | Yuasa | G06F 3/14 |
| 9,798,395 B2 * | 10/2017 | Ye | G09G 3/20 |
| 9,858,648 B2 * | 1/2018 | Li | G06F 3/0487 |
| 9,886,192 B2 * | 2/2018 | Masuko | G09G 5/00 |
| 9,942,464 B2 | 4/2018 | Voss | |
| 9,953,454 B1 * | 4/2018 | Rivard | G06T 3/60 |
| 10,088,866 B2 * | 10/2018 | Braun | G06F 3/013 |
| 10,102,829 B2 * | 10/2018 | Paulson | G09G 5/32 |
| 10,109,098 B2 * | 10/2018 | Feder | G09G 5/37 |
| 10,186,019 B2 * | 1/2019 | Homma | G06F 1/1694 |
| 10,365,820 B2 * | 7/2019 | Lee | G06F 3/04883 |
| 10,366,526 B2 * | 7/2019 | Rivard | G09G 5/37 |
| 10,410,605 B2 * | 9/2019 | Gardenfors | G06F 1/1626 |
| 10,552,016 B2 * | 2/2020 | Cherna | G06F 3/04845 |
| 10,552,946 B2 * | 2/2020 | Furukawa | G06F 1/1694 |
| 10,627,854 B2 * | 4/2020 | Gurr | F16H 19/001 |
| 2002/0063714 A1 | 5/2002 | Haas et al. | |
| 2004/0150622 A1 | 8/2004 | Bohn | |
| 2004/0184115 A1 | 9/2004 | Suzuki | |
| 2005/0022131 A1 * | 1/2005 | Saint-Hilaire | G06T 13/80 |
| | | | 715/740 |
| 2005/0104848 A1 * | 5/2005 | Yamaguchi | G06F 1/1626 |
| | | | 345/156 |
| 2005/0143124 A1 * | 6/2005 | Kennedy | G06F 1/1626 |
| | | | 455/556.1 |
| 2005/0154798 A1 | 7/2005 | Nurmi | |
| 2005/0237587 A1 * | 10/2005 | Nakamura | H04N 1/00294 |
| | | | 358/527 |
| 2005/0237588 A1 * | 10/2005 | Gohara | H04N 1/00132 |
| | | | 358/538 |
| 2006/0026535 A1 | 2/2006 | Hotelling et al. | |
| 2006/0029292 A1 | 2/2006 | Hagiwara | |
| 2006/0033760 A1 * | 2/2006 | Koh | G09G 5/363 |
| | | | 345/649 |
| 2006/0039630 A1 | 2/2006 | Kotani | |
| 2006/0133695 A1 | 6/2006 | Obinata | |
| 2007/0004451 A1 | 1/2007 | Anderson | |
| 2007/0045433 A1 | 3/2007 | Chapman et al. | |
| 2007/0136208 A1 | 6/2007 | Hamashima et al. | |

(56) References Cited

U.S. PATENT DOCUMENTS

| | | | |
|---|---|---|---|
| 2007/0236515 A1* | 10/2007 | Montague | G06F 3/04845 345/649 |
| 2007/0236709 A1 | 10/2007 | Mitani | |
| 2007/0296820 A1* | 12/2007 | Lonn | G06K 9/3208 348/207.99 |
| 2008/0001945 A1 | 1/2008 | Kashito et al. | |
| 2008/0001950 A1* | 1/2008 | Lin | G06T 13/80 345/473 |
| 2008/0043032 A1 | 2/2008 | Mamona et al. | |
| 2008/0076481 A1 | 3/2008 | Iwasaki et al. | |
| 2008/0122796 A1 | 5/2008 | Jobs et al. | |
| 2008/0165144 A1 | 7/2008 | Forstall et al. | |
| 2008/0174570 A1 | 7/2008 | Jobs et al. | |
| 2008/0266326 A1 | 10/2008 | Porwal | |
| 2008/0307363 A1 | 12/2008 | Jalon et al. | |
| 2009/0002335 A1 | 1/2009 | Chaudhri | |
| 2009/0002391 A1* | 1/2009 | Williamson | G06F 3/04845 345/619 |
| 2009/0002395 A1 | 1/2009 | Yamada | |
| 2009/0058882 A1 | 3/2009 | Adachi et al. | |
| 2009/0237420 A1* | 9/2009 | Lawrenz | G06F 1/1601 345/649 |
| 2009/0262074 A1 | 10/2009 | Nasiri et al. | |
| 2010/0007603 A1* | 1/2010 | Kirkup | G06F 1/1616 345/158 |
| 2010/0066763 A1* | 3/2010 | MacDougall | G06F 1/1626 345/656 |
| 2010/0079494 A1* | 4/2010 | Sung | G06F 1/1626 345/650 |
| 2010/0118115 A1* | 5/2010 | Takahashi | H04N 1/00291 348/24 |
| 2010/0123737 A1* | 5/2010 | Williamson | G01C 21/3647 345/672 |
| 2010/0123929 A1 | 5/2010 | Yoshimoto | |
| 2010/0146446 A1* | 6/2010 | Ahn | G06F 3/04817 715/821 |
| 2010/0149377 A1 | 6/2010 | Shintani et al. | |
| 2010/0218113 A1* | 8/2010 | White | G06F 1/1626 715/746 |
| 2010/0302278 A1 | 12/2010 | Shaffer et al. | |
| 2010/0302408 A1 | 12/2010 | Ito | |
| 2010/0315656 A1 | 12/2010 | Agata | |
| 2010/0317332 A1 | 12/2010 | Bathiche et al. | |
| 2010/0333044 A1* | 12/2010 | Kethireddy | G06F 3/04883 715/863 |
| 2011/0012914 A1* | 1/2011 | Nakamura | G06T 15/04 345/582 |
| 2011/0037712 A1* | 2/2011 | Kim | H04M 1/72583 345/173 |
| 2011/0037777 A1 | 2/2011 | Lindahl et al. | |
| 2011/0057880 A1* | 3/2011 | Kasahara | G06F 1/1626 345/158 |
| 2011/0074973 A1 | 3/2011 | Hayashi | |
| 2011/0090256 A1 | 4/2011 | Manchester | |
| 2011/0158473 A1 | 6/2011 | Sun et al. | |
| 2011/0167382 A1 | 7/2011 | van Os | |
| 2011/0187749 A1* | 8/2011 | Dehmann | G06F 3/04842 345/649 |
| 2011/0193982 A1 | 8/2011 | Kook et al. | |
| 2011/0261075 A1 | 10/2011 | Tanaka | |
| 2011/0298982 A1 | 12/2011 | Kobayashi | |
| 2011/0310094 A1* | 12/2011 | Park | G06F 1/1626 345/419 |
| 2012/0001943 A1 | 1/2012 | Ishidera | |
| 2012/0033262 A1 | 2/2012 | Sakurai | |
| 2012/0044266 A1 | 2/2012 | Mori | |
| 2012/0056889 A1 | 3/2012 | Carter et al. | |
| 2012/0057064 A1* | 3/2012 | Gardiner | G06F 3/0346 348/333.12 |
| 2012/0081382 A1 | 4/2012 | Lindahl et al. | |
| 2012/0139904 A1 | 6/2012 | Lee et al. | |
| 2012/0154276 A1 | 6/2012 | Shin et al. | |
| 2012/0162251 A1* | 6/2012 | Minamino | G11B 27/34 345/629 |
| 2012/0162263 A1* | 6/2012 | Griffin | G06F 1/1624 345/652 |
| 2012/0176413 A1* | 7/2012 | Kulik | G06F 1/1626 345/659 |
| 2012/0206488 A1* | 8/2012 | Wong | G06F 3/147 345/649 |
| 2012/0229370 A1 | 9/2012 | Stroffolino et al. | |
| 2012/0242683 A1* | 9/2012 | Asai | H04N 1/00392 345/619 |
| 2012/0250082 A1 | 10/2012 | Mori | |
| 2012/0256959 A1* | 10/2012 | Ye | G06F 3/0488 345/649 |
| 2012/0294533 A1* | 11/2012 | Ikenoue | H04N 1/3877 382/195 |
| 2012/0299964 A1* | 11/2012 | Homma | G06F 3/02 345/649 |
| 2012/0324400 A1* | 12/2012 | Caliendo, Jr. | G06F 3/0481 715/835 |
| 2013/0016122 A1 | 1/2013 | Bhatt et al. | |
| 2013/0038634 A1* | 2/2013 | Yamada | G09G 5/00 345/649 |
| 2013/0069988 A1* | 3/2013 | Kamei | G06F 1/1637 345/658 |
| 2013/0069989 A1 | 3/2013 | Nagata et al. | |
| 2013/0120256 A1* | 5/2013 | Ishidera | G09G 5/36 345/158 |
| 2013/0141464 A1 | 6/2013 | Hunt et al. | |
| 2013/0162542 A1* | 6/2013 | Badali | G06F 1/1684 345/169 |
| 2013/0176222 A1 | 7/2013 | Tanaka | |
| 2013/0205244 A1 | 8/2013 | Decker et al. | |
| 2013/0222231 A1 | 8/2013 | Gardenfors et al. | |
| 2013/0222516 A1* | 8/2013 | Do et al. | H04N 7/141 348/14.01 |
| 2013/0222646 A1 | 8/2013 | Tsubota et al. | |
| 2013/0235071 A1 | 9/2013 | Ubillos et al. | |
| 2013/0262486 A1 | 10/2013 | O'Dell et al. | |
| 2013/0293502 A1* | 11/2013 | Kitatani | G06F 1/1643 345/173 |
| 2013/0328935 A1* | 12/2013 | Tu | G06F 1/1694 345/651 |
| 2013/0335317 A1 | 12/2013 | Liu et al. | |
| 2014/0055494 A1* | 2/2014 | Mikawa | G06F 1/1626 345/649 |
| 2014/0063611 A1 | 3/2014 | Raymond et al. | |
| 2014/0075286 A1 | 3/2014 | Harada | |
| 2014/0075372 A1 | 3/2014 | Wu et al. | |
| 2014/0078171 A1 | 3/2014 | Miyatake et al. | |
| 2014/0085339 A1* | 3/2014 | Brady | G06T 3/60 345/649 |
| 2014/0085430 A1* | 3/2014 | Komori | G03B 17/18 348/47 |
| 2014/0096064 A1 | 4/2014 | Suzuki | |
| 2014/0111548 A1* | 4/2014 | Shin | G09G 5/32 345/650 |
| 2014/0118256 A1 | 5/2014 | Sonoda et al. | |
| 2014/0168271 A1* | 6/2014 | Yu | G06F 3/012 345/652 |
| 2014/0177008 A1 | 6/2014 | Raymond et al. | |
| 2014/0210754 A1* | 7/2014 | Ryu | G06F 1/1694 345/173 |
| 2014/0215365 A1* | 7/2014 | Hiraga | G06F 3/04883 715/765 |
| 2014/0240453 A1 | 8/2014 | Kim et al. | |
| 2014/0240543 A1* | 8/2014 | Kim | H04N 5/2258 348/231.99 |
| 2014/0258674 A1* | 9/2014 | Kim | G06F 12/1027 711/204 |
| 2014/0307001 A1* | 10/2014 | Aizawa | G09G 3/20 345/659 |
| 2014/0340428 A1* | 11/2014 | Shibayama | G06T 1/20 345/659 |
| 2014/0359517 A1 | 12/2014 | Elings et al. | |
| 2014/0362117 A1* | 12/2014 | Paulson | G06F 1/1694 345/659 |

(56) References Cited

U.S. PATENT DOCUMENTS

| | | | |
|---|---|---|---|
| 2014/0365977 A1* | 12/2014 | Elyada | G06F 3/0488 715/863 |
| 2014/0372914 A1* | 12/2014 | Byrd | G06F 3/04883 715/760 |
| 2015/0029226 A1* | 1/2015 | Feder | G06F 3/0346 345/650 |
| 2015/0035991 A1* | 2/2015 | Sachs | H04N 5/23216 348/187 |
| 2015/0042669 A1* | 2/2015 | Van Nostrand | G09G 5/395 345/545 |
| 2015/0049119 A1* | 2/2015 | Homma | G06F 3/02 345/649 |
| 2015/0070458 A1* | 3/2015 | Kim | G06T 3/60 348/14.07 |
| 2015/0091945 A1* | 4/2015 | Uratani | G06T 3/606 345/649 |
| 2015/0095775 A1* | 4/2015 | Lewis | G06F 3/0484 715/716 |
| 2015/0113368 A1* | 4/2015 | Flider | G06T 13/80 715/203 |
| 2015/0113370 A1* | 4/2015 | Flider | G06F 40/151 715/204 |
| 2015/0113371 A1* | 4/2015 | Flider | G06F 16/743 715/204 |
| 2015/0169166 A1* | 6/2015 | Kim | G06T 3/40 715/838 |
| 2015/0193912 A1* | 7/2015 | Yuasa | G06F 3/14 345/659 |
| 2015/0213784 A1* | 7/2015 | Jafarzadeh | G09G 5/00 345/163 |
| 2015/0215526 A1 | 7/2015 | Jafarzadeh et al. | |
| 2015/0215532 A1 | 7/2015 | Jafarzadeh et al. | |
| 2015/0278853 A1 | 10/2015 | McLaughlin et al. | |
| 2015/0278999 A1* | 10/2015 | Summers | G06Q 10/10 345/419 |
| 2015/0287189 A1* | 10/2015 | Hirai | G06T 7/0012 382/131 |
| 2015/0302587 A1 | 10/2015 | Hirano et al. | |
| 2015/0339002 A1 | 11/2015 | Arnold et al. | |
| 2015/0339006 A1 | 11/2015 | Chaland et al. | |
| 2015/0341536 A1 | 11/2015 | Huang et al. | |
| 2016/0026658 A1 | 1/2016 | Krishnaraj et al. | |
| 2016/0027150 A1* | 1/2016 | Lee | G09G 3/2092 345/650 |
| 2016/0034166 A1 | 2/2016 | Wilson et al. | |
| 2016/0034167 A1 | 2/2016 | Wilson et al. | |
| 2016/0062645 A1* | 3/2016 | Masuko | G09G 5/00 345/173 |
| 2016/0148551 A1* | 5/2016 | Jian | G09G 3/003 345/419 |
| 2016/0148648 A1 | 5/2016 | Dimson et al. | |
| 2016/0163289 A1* | 6/2016 | Masuko | G06T 7/74 345/659 |
| 2016/0170608 A1 | 6/2016 | Zambetti et al. | |
| 2016/0173782 A1 | 6/2016 | Dimson et al. | |
| 2016/0202866 A1 | 7/2016 | Zambetti et al. | |
| 2016/0202872 A1 | 7/2016 | Jang et al. | |
| 2016/0240168 A1* | 8/2016 | Keal | G09G 5/12 |
| 2016/0248968 A1 | 8/2016 | Baldwin | |
| 2016/0275650 A1* | 9/2016 | Case | G06T 3/606 |
| 2016/0313781 A1* | 10/2016 | Jeon | G06F 1/3265 |
| 2016/0330383 A1 | 11/2016 | Oyama | |
| 2016/0344927 A1 | 11/2016 | Brasket et al. | |
| 2016/0357420 A1 | 12/2016 | Wilson et al. | |
| 2017/0048442 A1 | 2/2017 | Cote et al. | |
| 2017/0061669 A1* | 3/2017 | Hirano | B60K 37/00 |
| 2017/0236253 A1 | 8/2017 | Restrepo et al. | |
| 2017/0278292 A1* | 9/2017 | Feder | G09G 5/37 |
| 2017/0285743 A1 | 10/2017 | Yu et al. | |
| 2017/0323149 A1 | 11/2017 | Harary et al. | |
| 2018/0061126 A1 | 3/2018 | Huang et al. | |
| 2018/0067633 A1 | 3/2018 | Wilson et al. | |
| 2018/0088775 A1 | 3/2018 | Ye et al. | |
| 2018/0114351 A1* | 4/2018 | Rivard | G06F 3/0484 |
| 2018/0114352 A1* | 4/2018 | Rivard | G06T 3/60 |
| 2018/0115702 A1* | 4/2018 | Brauer | G06F 3/0346 |
| 2018/0130182 A1 | 5/2018 | Bhatt et al. | |
| 2018/0341383 A1* | 11/2018 | Sully | H04N 5/23293 |
| 2019/0035135 A1* | 1/2019 | Feder | G06T 3/60 |
| 2019/0347843 A1* | 11/2019 | Rivard | G09G 5/37 |
| 2020/0106956 A1* | 4/2020 | Kimball | H04N 5/23219 |

OTHER PUBLICATIONS

Non-Final Office Action from U.S. Appl. No. 14/340,557, dated Jan. 21, 2016.
Final Office Action from U.S. Appl. No. 14/340,557, dated Sep. 16, 2016.
Easy Flex, Two Examples of Layout Animations, Apr. 11, 2010, pp. 1-11, http://evtimmy.com/2010/04/two-examples-of-layout-animations/.
Tidwell, J., "Animated Transition," from Designing Interfaces, O'Reilly Media, Inc., Dec. 2010, pp. 127-129.
Notice of Allowance from U.S. Appl. No. 15/331,733, dated Dec. 7, 2016.
Notice of Allowance from U.S. Appl. No. 14/340,557, dated Mar. 3, 2017.
Notice of Allowance from U.S. Appl. No. 15/331,733, dated Apr. 17, 2017.
Non-Final Office Action from U.S. Appl. No. 15/452,639, dated May 11, 2017.
International Search Report and Written Opinion from PCT Application No. PCT/US17/57704, dated Nov. 16, 2017.
Notice of Allowance from U.S. Appl. No. 15/452,639, dated Nov. 30, 2017.
Corrected Notice of Allowance from U.S. Appl. No. 14/340,557, dated Jul. 27, 2017.
Non-Final Office Action from U.S. Appl. No. 15/622,520, dated Jan. 10, 2018.
Notice of Allowance from U.S. Appl. No. 15/622,520, dated Jul. 18, 2018.
Non-Final Office Action from U.S. Appl. No. 15/642,074, dated Oct. 19, 2018.
Notice of Allowance from U.S. Appl. No. 15/642,074, dated Apr. 10, 2019.
Non-Final Office Action from U.S. Appl. No. 16/518,786, dated Jun. 29, 2020.

* cited by examiner

SYSTEMS AND METHODS FOR DISPLAYING REPRESENTATIVE IMAGES

CROSS-REFERENCES TO RELATED APPLICATIONS

The present application is a continuation of, and claims priority to, U.S. patent application Ser. No. 15/622,520, filed Jun. 14, 2017, entitled "SYSTEMS AND METHODS FOR DISPLAYING REPRESENTATIVE IMAGES," which is a continuation of, and claims priority to, U.S. patent application Ser. No. 14/340,557, filed Jul. 24, 2014, entitled "SYSTEMS AND METHODS FOR DISPLAYING REPRESENTATIVE IMAGES," now U.S. Pat. No. 9,741,150, which in turn claims priority to U.S. Provisional Application No. 61/958,324, entitled "Systems and methods for digital photography," filed Jul. 25, 2013. The foregoing applications and/or patents are herein incorporated by reference in their entirety for all purposes.

FIELD OF THE INVENTION

Embodiments of the present invention relate generally to user interface design, and more specifically to systems and methods for displaying representative images.

BACKGROUND

A typical mobile computing device, or simply "mobile device," such as a smartphone or tablet computer, includes a computation subsystem, and a display screen configured to display a user interface (UI) comprising elements such as control widgets and representative images of files accessible through the UI. A representative image may comprise a thumbnail image associated with an application, script, or data file residing within a file system or file database. One example of a representative image is an image thumbnail. Another example of a representative image is a file icon. Representative images are typically presented to a user within a collection viewer that is configured to allow the user to browse, select, view, execute, and otherwise interact with corresponding objects. One example of a collection viewer is a file browser, which may be configured to show users a list of files within a file system depicted as icons. Another example of a collection viewer is an image browser, configured to show users a list of images within a file system or image database depicted as thumbnails.

A UI for a mobile device typically includes a collection viewer for files and may include a collection viewer for images. A collection viewer for digital images may similarly present thumbnails associated with digital images residing within an image database or within a file system folder of digital images. The collection viewer enables the user to browse thumbnails, and to open a digital image by performing a touch gesture on a corresponding thumbnail.

Mobile computing devices, or simply "mobile devices" may include an arbitrarily large number of files and corresponding icons that need to be presented within a collection viewer for files. Similarly, mobile devices may include an arbitrarily large number of digital images and corresponding thumbnails that need to be presented within a collection viewer for digital images. Typical collection viewers enable users to view a collection of representative images as a two-dimensional grid of representative images. The representative images are conventionally positioned within the grid according to a specific sequence, such as a file sequence number, a sort sequence number, or an image sequence number. The grid is populated with representative images frequently forming a tall, narrow form factor regardless of device orientation. Width of the grid is associated with horizontal screen width, which may be different in landscape versus portrait orientations. As a consequence, the physical location of a specific representative image may change when device orientation changes because the collection viewer typically needs to alter the grid layout and specific sequence of the representative images.

In conventional operation of a collection viewer, the user may locate a desired representative image by scrolling the grid vertically into an appropriate screen position. However, if the user then rotates their mobile device, the screen position of the desired representative image typically changes in response to the change in grid width, forcing the user to once again locate their desired representative image within the grid. Forcing the user to locate the desired representative image a second time after rotation introduces inefficiency and confusion in the user experience.

As the foregoing illustrates, there is a need for addressing this and/or other related issues associated with the prior art.

SUMMARY

A system, method, and computer program product for displaying representative images within a collection viewer is disclosed. The method comprises receiving an indication of a new orientation for the collection viewer, displaying a sequence of animation frames that depict an in-place rotation animation for the representative images, generating a rotation angle in a sequence of rotation angles, and displaying a rendered representative image for each of the two or more displayed representative images, wherein each rendered representative image is rotated according to the rotation angle

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Embodiments of the present invention enable a mobile device to present a consistent location of representative images regardless of device orientation within a user interface (UI). A collection viewer refers to a collection of software modules that generate a depiction of data objects within a UI. Displayed UI elements generated by the software modules may also be referred to generally as a collection viewer. A collection viewer is configured to present representative images of the data objects, such as file icons and image thumbnails to a user. A collection viewer may comprise a file browser, an image browser, or any other type of data object browser configured to depict data objects as representative images. When the user rotates the mobile device, the collection viewer generates an in-place rotation animation for each representative image. Keeping each representative image in substantially the same physical screen location regardless of device orientation allows the user to visually track a given representative image through device rotation, thereby providing a more efficient and intuitive user experience. Animating rotation of the representative images to maintain proper viewing orientation provides an intuitive visual cue, further improving the user experience.

Figure 1:
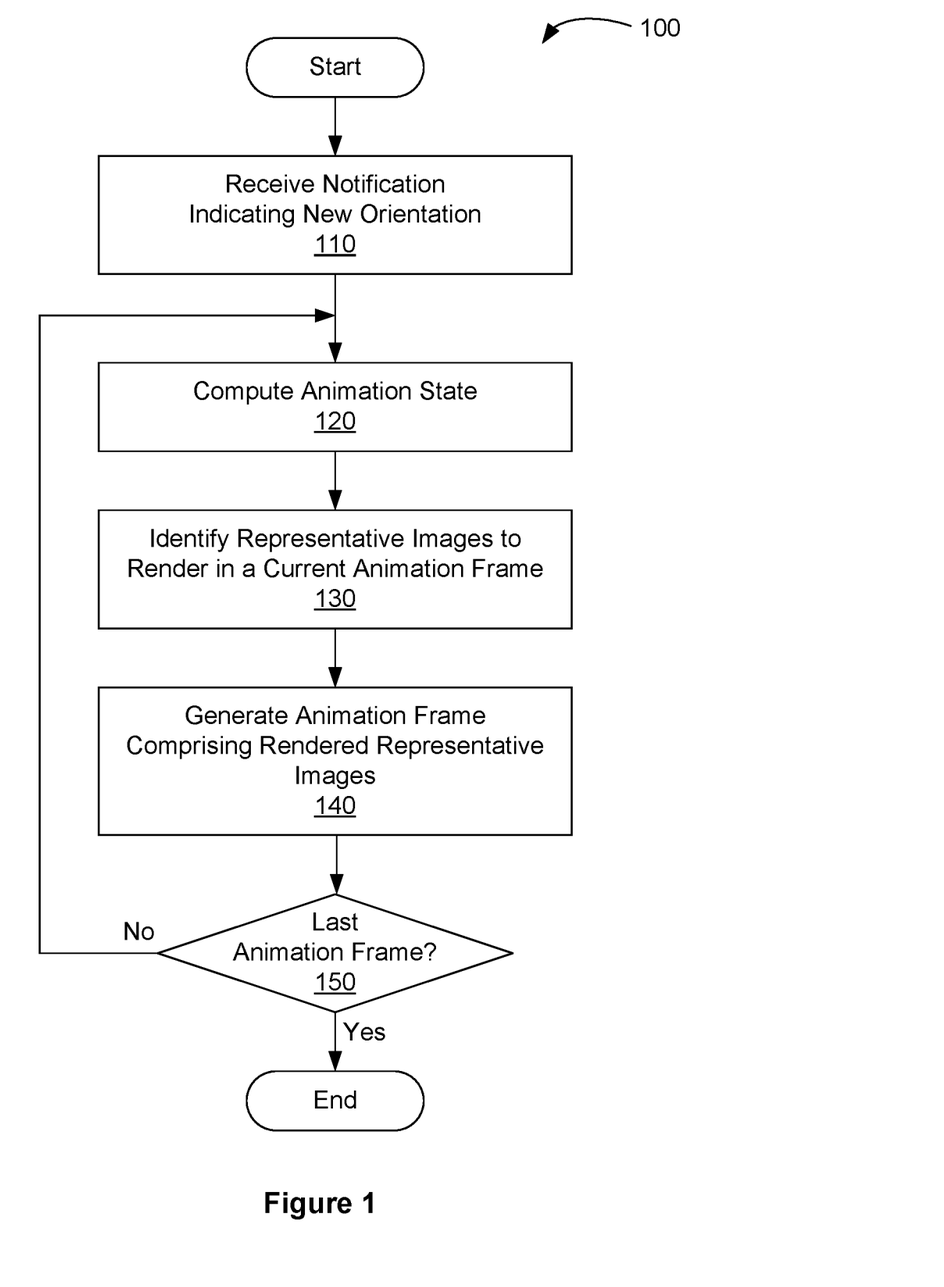
FIG. 1 illustrates a flow chart of a method for displaying a collection of representative images, according to one embodiment of the present invention.
Figure 2A:
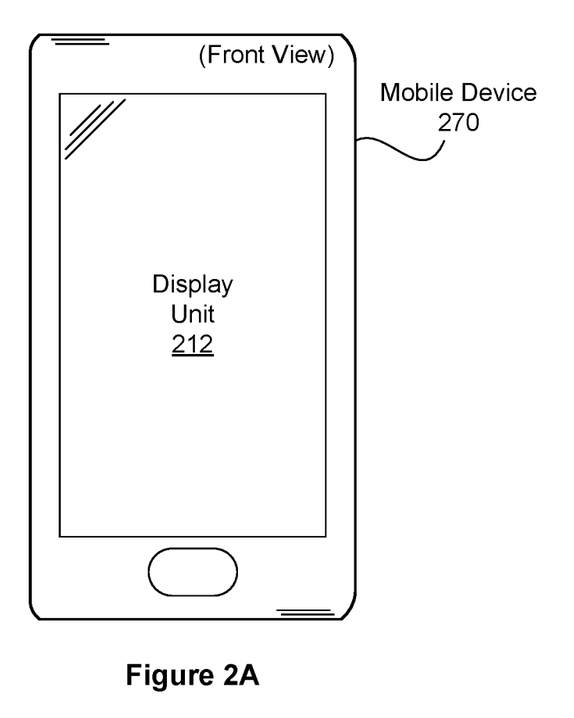
FIG. 2A illustrates a front view of a mobile device comprising a display unit, according to one embodiment of the present invention.
Figure 2B:
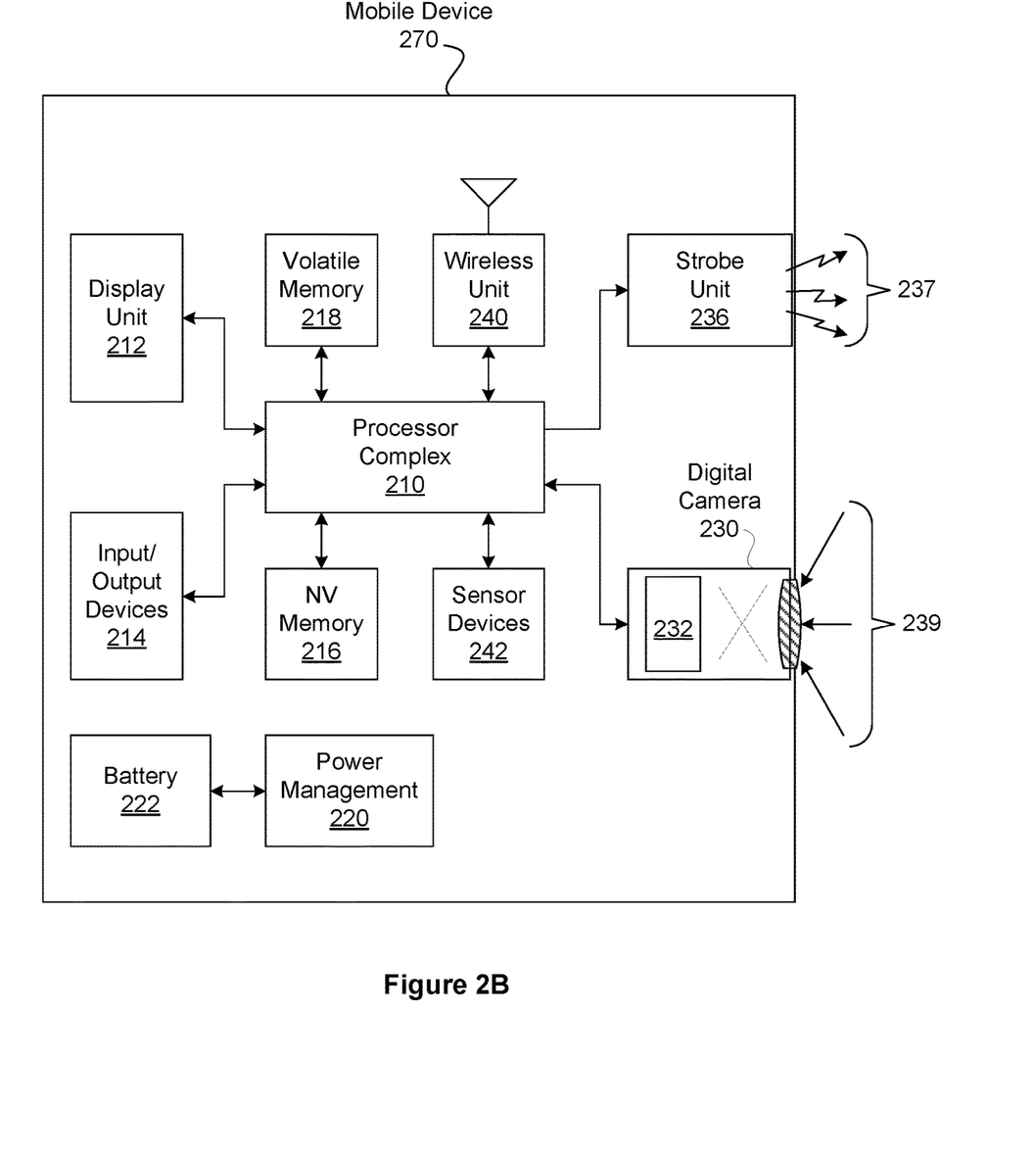
FIG. 2B illustrates a block diagram of a mobile device comprising a display unit, according to one embodiment of the present invention.

FIG. 1A illustrates a flow chart of a method 100 for displaying a collection of representative images, according to one embodiment of the present invention. Although method 100 is described in conjunction with the systems of FIGS. 2A-2B, persons of ordinary skill in the art will understand that any system that performs method 100 is within the scope and spirit of embodiments of the present invention. In one embodiment, a mobile device, such as mobile device 270 of FIGS. 2A-2B, is configured to perform method 100. by executing a collection viewer, implemented as a software module within mobile device 270.

Method 100 begins in step 110, where the collection viewer receives a notification indicating that the mobile device has been repositioned into a new orientation. In one embodiment, the notification indicates one of four orthogonal orientations, where a first orientation is associated with a generally upright portrait orientation, a second orientation is associated a clockwise rotation from the first orientation to a landscape orientation, a third orientation is associated with an upside down portrait orientation, and a fourth orientation is associated a counterclockwise rotation from the first orientation to a landscape orientation. Each of the four orientations represents an approximation of a physical orientation of the mobile device to the nearest ninety degrees. In other embodiments, the approximation of a physical orientation may comprise angular increments of less than ninety degrees to provide a finer approximation granularity. In certain embodiments, angular increments are substantially uniform, while in other embodiments, angular increments are non-uniform.

In one embodiment, physical orientation is generated from measurements performed by a sensor device, such as one of sensor devices 242. For example, an accelerometer, comprising sensor devices 242, may provide a physical measurement of a force vector corresponding to physical forces on the mobile device. When mobile device is held generally still, such as when a user is holding the mobile device, this measured force vector is generally aligned with a gravity force vector. When the measured force vector is aligned vertically and pointing from the top of the mobile device to the bottom of the mobile device, the mobile device is likely being held in an upright portrait orientation. When the measured force vector is rotated by approximately ninety degrees about a normal vector to display unit 212, the device is likely being held in a landscape orientation, and so forth. While approximating orientation is described herein based on a measured force vector, other techniques of approximating orientation may be performed without departing the scope and spirit of embodiments of the present invention.

Any technically feasible technique may be implemented for sending a notification to the collection viewer. For example, the notification may comprise a message in an object message passing system. In this example, an instance of the collection viewer is configured to receive a new orientation message when the mobile device changes to a new orientation. A software module, such as a system service module, is configured to approximate device orientation, for example, by monitoring an accelerometer within sensor devices 242. The new orientation message may specify a new orientation, or the new orientation message may specify that the device is in a new orientation and trigger the collection viewer to determine the new orientation. The new orientation message may indicate that the device has changed orientation beyond a specified angular threshold, enabling the collection viewer to determine an orientation for display, such as in embodiments that implement finer rotational granularity than ninety degree granularity. The system service module may include a kernel process configured to monitor hardware circuits comprising the sensor devices 242, an application programming interface (API) configured to respond to the kernel process, a process executing in application space that is configured to monitor sensor devices 242 and generate messages based on specified criteria, or any other technically feasible mechanism for providing orientation notifications to the collection viewer.

In one embodiment, hysteresis is applied to an orientation approximation, so that a change in physical orientation needs to surpass a certain rotational threshold to trigger generation of the notification of a new orientation. In such an embodiment, the system services module applies hysteresis to physical orientation measurements so that a notification is generated only after a specified orientation threshold is exceeded. In other embodiments, the collection viewer is configured to apply hysteresis to notifications, such as notifications for changes of less than ninety degrees or less than an orientation change threshold.

In step 120, the collection viewer, or a helper function to the collection viewer, computes a current animation state for a current animation sequence. A current animation sequence may include a scroll animation, a rotation animation, or a combination thereof triggered by a physical change in device orientation. A given current animation sequence is initiated in response to receiving the notification. In one embodiment, the current animation sequence defines a sequence of frames, as discussed in greater detail below in FIG. 3E. In one embodiment, a given animation sequence completed before a subsequent animation sequence is initiated. The current animation state may define a current scroll position and a current rotation angle for a collection of representative images being animated in the current animation sequence. The current animation state may determine which representative images are visible within view panel 311.

Figure 3A:
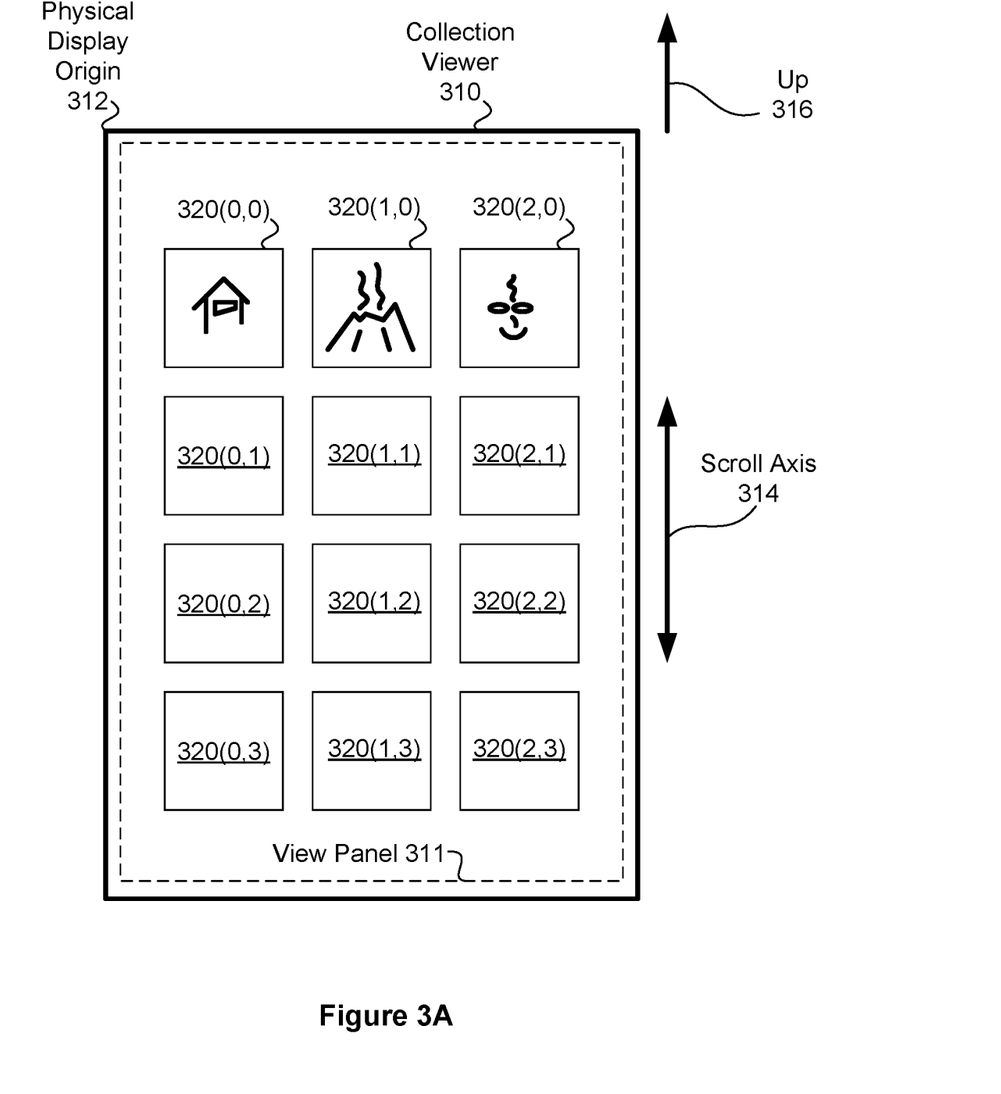
FIG. 3A illustrates a collection viewer configured in a portrait orientation, according to one embodiment of the present invention.

In step 130, the collection viewer, or a helper function to the collection viewer, identifies representative images to render in a current animation frame. Any technically feasible technique may be used to identify representative images to render. In one embodiment, only visible representative images are identified to render in the current frame. In one embodiment, a visible representative image includes geometry that intersects at least one pixel within view panel 311. In another embodiment, visible representative images and at least one non-visible representative image are identified to render in a current animation frame. In one embodiment, when a representative image is newly visible in a current animation frame, that representative image is instantiated for display and the instantiated representative image instance is sent a message to render an associated representative image according to the current animation state. Other representative image instances may be sent a substantially similar message to render an associated representative image according to the current animation state. In certain embodiments, a representative image instance that is no longer visible is de-allocated at the completion of the animation sequence.

In step 140, the collection viewer, or a helper function to the collection viewer, generates an animation frame comprising rendered representative images. In one embodiment, the animation frame includes one rendered representative image. In another embodiment, the animation frame includes two or more rendered representative images. Each rendered representative image includes a representative image that has been translated, rotated, or both translated and rotated in accordance with the current animation state. At least a portion of each rendered representative image may be presented within view panel 311. In one embodiment, the generated animation frame is displayed on display unit 212 of FIG. 2A. In one embodiment, each animation frame is rendered by a graphics processing unit (GPU) within processor complex 210 of FIG. 2B.

If, in step 150, the current animation frame is the last animation frame, then the method terminates. Otherwise, the method proceeds back to step 120.

System Overview

FIG. 2A illustrates a front view of a mobile device 270 comprising a display unit 212, according to one embodiment of the present invention. Display unit 212 is configured to display user interface (UI) elements associated with software applications configured to execute on mobile device 270. The UI elements may include representative images, such as file icons and image thumbnails.

FIG. 2B illustrates a block diagram of mobile device 270, according to one embodiment of the present invention. Mobile device 270 includes a processor complex 210 coupled to display unit 212. Mobile device 270 may also include, without limitation, a digital camera 230, a strobe unit 236, a set of input/output devices 214, non-volatile memory 216, volatile memory 218, a wireless unit 240, and sensor devices 242, each coupled to processor complex 210. In one embodiment, a power management subsystem 220 is configured to generate appropriate power supply voltages for each electrical load element within mobile device 270, and a battery 222 is configured to supply electrical energy to power management subsystem 220. Battery 222 may implement any technically feasible battery, including primary or rechargeable battery technologies. Alternatively, battery 222 may be implemented as a fuel cell, or high capacity electrical capacitor.

In one usage scenario, strobe illumination 237 comprises at least a portion of overall illumination in a scene being photographed by digital camera 230. Optical scene information 239, which may include strobe illumination 237 reflected from objects in the scene, is focused onto an image sensor 232 as an optical image. Image sensor 232, within digital camera 230, generates an electronic representation of the optical image. The electronic representation comprises spatial color intensity information, which may include different color intensity samples for red, green, and blue light.

Display unit 212 is configured to display a two-dimensional array of pixels to form a digital image for display. Display unit 212 may comprise a liquid-crystal display, an organic LED display, or any other technically feasible type of display. Input/output devices 214 may include, without limitation, a capacitive touch input surface, a resistive tablet input surface, buttons, knobs, or any other technically feasible device for receiving user input and converting the input to electrical signals. In one embodiment, display unit 212 and a capacitive touch input surface comprise a touch entry display system, and input/output devices 214 comprise a speaker and microphone.

Non-volatile (NV) memory 216 is configured to store data when power is interrupted. The NV memory 216 therefore implements a non-transitory computer-readable medium. In one embodiment, NV memory 216 comprises one or more flash memory devices. NV memory 216 may be configured to include programming instructions for execution by one or more processing units within processor complex 210. The programming instructions may include, without limitation, an operating system (OS), user interface (UI) modules, imaging processing and storage modules, and modules implementing one or more embodiments of techniques taught herein. In particular, the NV memory 216 may be configured to store instructions that implement method 100 of FIG. 1. The instructions, when executed by processing units within processor complex 210, cause the processing units to perform method 100. One or more memory devices comprising NV memory 216 may be packaged as a module that can be installed or removed by a user. In one embodiment, volatile memory 218 comprises dynamic random access memory (DRAM) configured to temporarily store programming instructions, image data, and the like needed during the course of normal operation of mobile device 270. Sensor devices 242 include sensors configured to detect at least device orientation of the mobile device 270. For example sensor devices 242 may include an accelerometer to detect motion and orientation, an electronic gyroscope to detect motion and orientation, or a combination thereof. Sensor devices 242 may also include, without limitation, a magnetic flux detector to detect orientation, a global positioning system (GPS) module to detect geographic position, or any combination thereof.

Wireless unit 240 may include one or more digital radios configured to send and receive digital data. In particular, wireless unit 240 may implement wireless standards known in the art as "WiFi" based on institute for electrical and electronics engineers (IEEE) standard 802.11, and may implement digital cellular telephony standards for data communication such as the well-known "3G" and long term evolution ("LTE"), or "4G" suites of standards. In one embodiment, mobile device 270 is configured to transmit one or more digital photographs residing within either NV memory 216 or volatile memory 218 to an online photographic media service via wireless unit 240. In such an embodiment, a user may possess credentials to access the online photographic media service and to transmit the one or more digital photographs for storage and presentation by the online photographic media service. The credentials may be stored or generated within mobile device 270 prior to transmission of the digital photographs. The online photographic media service may comprise a social networking service, photograph sharing service, or any other web-based service that provides storage and download of digital photographs. In certain embodiments, mobile device 270 is configured to receive one or more incoming digital photographs via wireless unit 240, and store the incoming digital photographs in the NV memory 216, or the volatile memory 218, or a combination thereof.

Collection Viewer

FIG. 3A illustrates a collection viewer 310 configured in a portrait orientation, according to one embodiment of the present invention. As shown, a physical display origin 312 is disposed in an upper left corner, and a scroll axis 314 is aligned vertically. That is, the scroll axis 314 is generally aligned with respect to a physical "up" direction 316.

In one embodiment, collection viewer 310 allows a user to scroll a collection of representative images 320, along scroll axis 314 in response to an input scroll command. The collection of representative images 320 may be organized in a grid, with a portion of the representative images 320 visible within a view panel 311. A swipe gesture performed on a capacitive input device within display unit 212 may serve as the input scroll command. In one embodiment, view panel 311 is configured to have a rectangular form, including a larger dimension and a smaller dimension. In such an embodiment, the term "portrait orientation" refers to an orientation for view panel 311 with the larger dimension generally oriented along the up direction 316. The term "landscape orientation" refers to an orientation for view panel 311 with the smaller dimension generally oriented along the up direction 316. In other embodiments, view panel 311 may be square. In such embodiments, "portrait orientation" and "landscape orientation" comprise arbitrary but orthogonal orientations of view panel 311.

While collection viewer 310 is illustrated here as a UI element having a view panel 311, the term "collection viewer" is defined broadly herein to include a software module configured to generate the UI element and display representative images 320 within view panel 311.

When a user rotates mobile device 270 into a new position, the collection viewer may reconfigure presentation of representative images 320 by causing the representative images 320 to rotate to an angle consistent with the new position. For example, the user may initially hold mobile device 270 in a portrait orientation. The user may then rotate the device orientation into a landscape orientation. In this example, mobile device 270 may detect a sufficient change in orientation and cause collection viewer 310 to transition from a portrait orientation to a landscape orientation, illustrated below in FIG. 3B. In other embodiments, different orientations may be implemented according to arbitrary angles having finer granularity than orthogonal angles. Detecting a sufficient change may include a hysteresis function in device orientation.

Figure 3B:
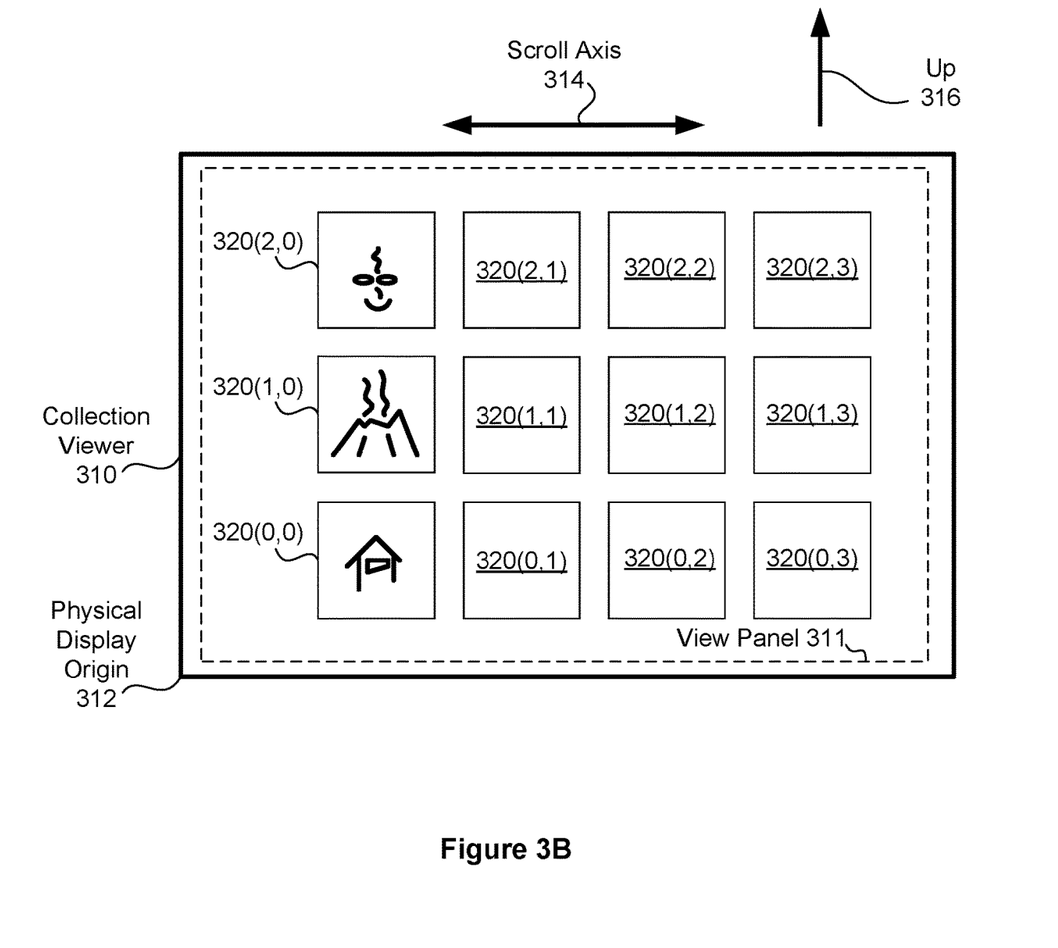
FIG. 3B illustrates a collection viewer configured in a landscape orientation, according to one embodiment of the present invention.

FIG. 3B illustrates collection viewer 310 configured in a landscape orientation, according to one embodiment of the present invention. As shown, the physical display origin 312 is disposed in a lower left corner, and a scroll axis 314 is aligned horizontally.

In a typical usage scenario, a user holds their head in an upright position, and therefore prefers to view representative images 320 rendered according to the physical up direction 316. As shown, representative images 320 are rotated to be viewed in an orientation consistent with the up direction 316. In one embodiment, representative images 320 are rotated in place. In one embodiment, rotation in place comprises performing an animation, such as a rotation animation, fade animation, or other transition animation, for each representative image 320. In one embodiment, animation for all representative images 320 is performed substantially synchronously, so that all displayed representative image 320 appear to move together. By rotating representative images 320 in place, collection viewer 310 is able to present a physical metaphor of the representative images 320 that is consistent with a physical device rotation. By contrast, prior art systems typically rearrange thumbnails, leading to user confusion and breaking any perceived consistency with physical device rotation.

Figure 3C:
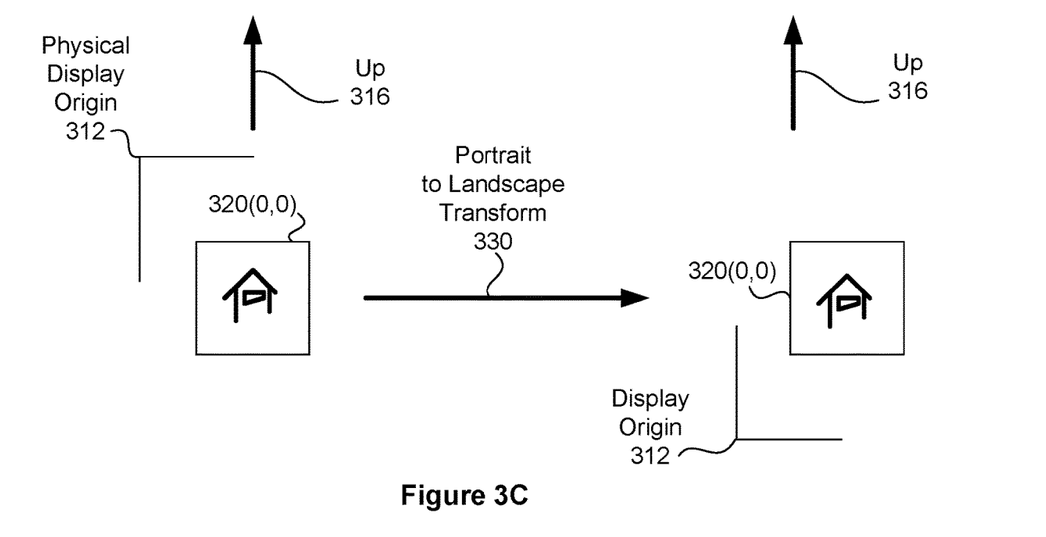
FIG. 3C illustrates one representative image in two different orientations as viewed by a user with respect to a physical up direction, according to one embodiment of the present invention.

FIG. 3C illustrates representative image 320(0,0) of FIG. 3A in two different orientations as viewed by a user, according to one embodiment of the present invention. A portrait to landscape transform 330 is implemented to animate a clockwise rotation of representative image 320(0,0) from a portrait orientation to a landscape orientation. Additional transforms may be similarly implemented to animate transitions between each different discrete rotation position. Here, representative image 320(0,0) is rotated ninety degrees in a clockwise direction to compensate for a ninety degree counter-clockwise rotation of physical display origin 312. As shown, representative image 320(0,0) is rotated to be viewable in a generally upright orientation regardless of orientation of physical display origin 312. In other embodiments, finger-grain discrete rotation positions may be similarly implemented.

Figure 3D:
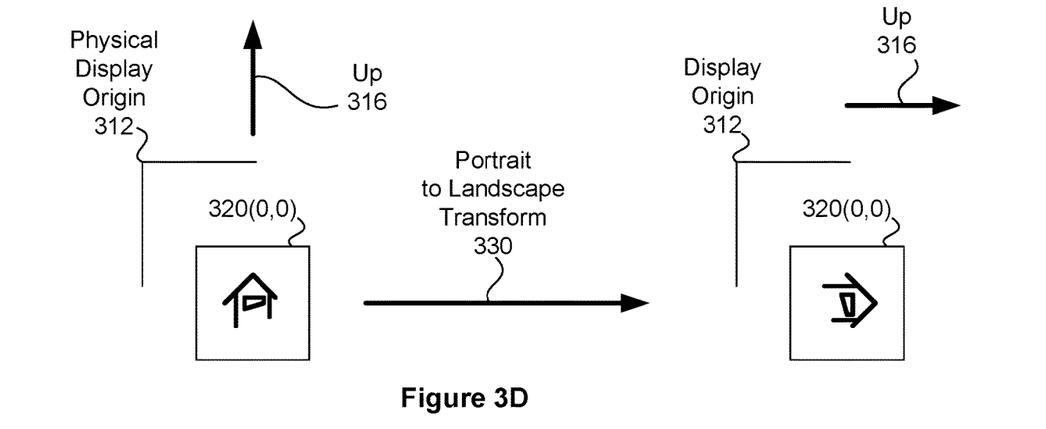
FIG. 3D illustrates one representative image in two different orientations with respect to a physical display origin, according to one embodiment of the present invention.

FIG. 3D illustrates representative image 320(0,0) in two different orientations with respect to the physical display origin 312 of FIG. 3A, according to one embodiment of the present invention. As described above, portrait to landscape transform 330 implements a rotation of representative image 320(0,0). As shown, representative image 320(0,0) is rotated relative to physical display origin 312.

Figure 3E:
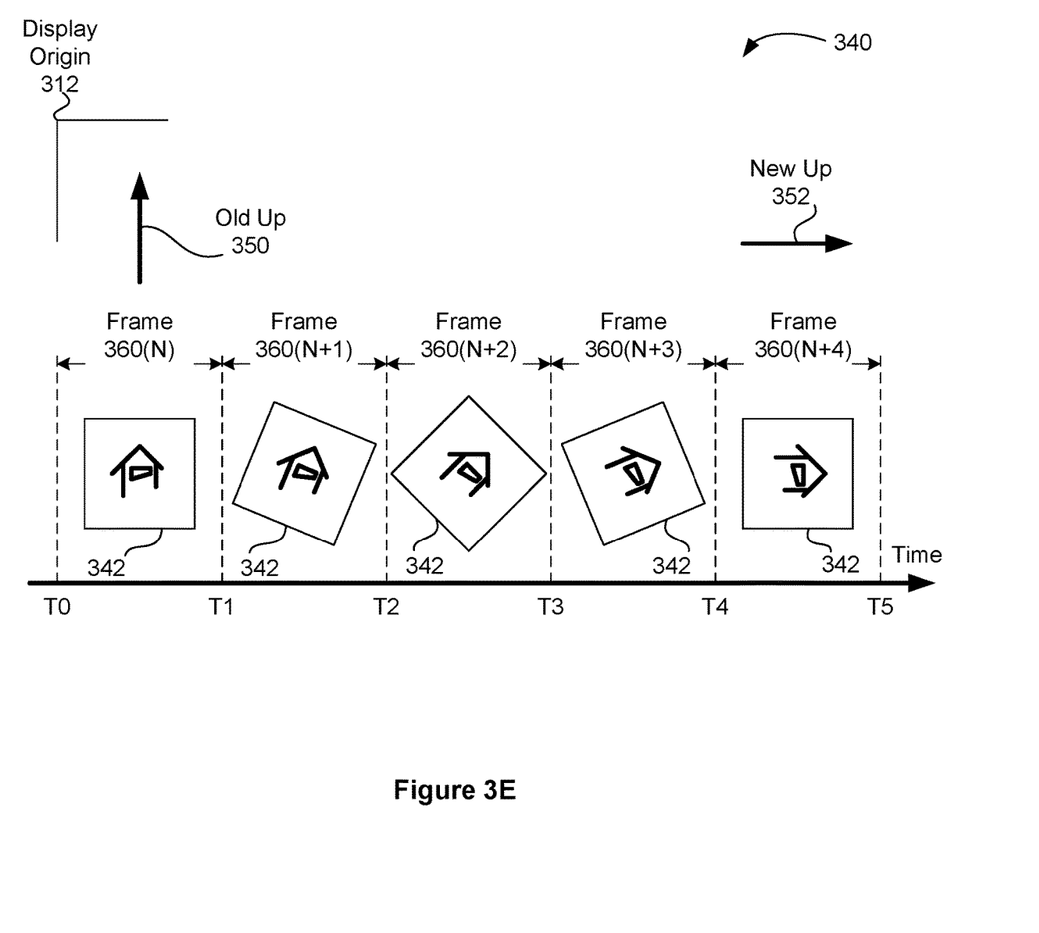
FIG. 3E depicts an animation sequence of frames for one representative image transitioning between two different orientations, according to one embodiment of the present invention.

FIG. 3E depicts an animation sequence 340 of frames 360 for one representative image transitioning between two different orientations, according to one embodiment of the present invention. As shown, a representative image 342 is rotated in sequential frames 360(N) to 360(N+4) to generate a rotation animation of representative image 342. The rotation animation depicts a rotational movement of the representative image 342 from an initial position at time T0, to a new position at time T4. In this example, a user rotates mobile device 270 counter-clockwise from a portrait orientation to a landscape orientation between time T0 and time T1, thereby triggering a clockwise animation of representative image 342. In the process, a new physical up direction is established. A new up direction 352 consequently replaces an old up direction 350. The animation sequence depicts rotational movement of representative image 342 to generally negate the physical rotation of mobile device 270. In one embodiment the animation sequence is timed independently of physical rotation once a rotation event is detected. In other embodiments, the animation sequence is timed to substantially track physical rotation once a rotation event is detected.

Representative image 342 may be rendered in each rotational position associated with each incremental frame 360. Although three intermediate frames 360(N+1), 360(N+2), and 360(N+3) are shown, animation sequence 340 may implement an arbitrary number of intermediate frames. In one embodiment, animation sequence 340 is initiated and completed during a time span of less than one second, but more than ten milliseconds. In certain implementations, duration of animation sequence 340 may be measured as an integral multiple of a number of frame times needed to display intermediate frames as refresh frames on display device 212. In one embodiment, each representative image being displayed within view panel 311 is animated substantially synchronously, so that each animation step for each representative image is completed together. For example, animation frame 360(N+1) is rendered and displayed at or before time T2 for each representative image 320 of FIG. 3A. In other embodiments, looser synchronization may be implemented, so that each representative image 220 completes a respective animation sequence within a specified maximum number frame times, such as less than five frame times, or less than sixty frame times. In certain embodiments, an animation sequence models certain physical behaviors or properties, such as momentum, oscillation, friction, and the like. For example, an animation sequence may depict the representative images overshooting their rotation and springing back into proper position. An arbitrary rotation function may be applied with respect to time to provide such effects.

In alternative embodiments, transition effects other than a rotation animation may be implemented. For example, one alternative transition effect to a rotation animation is an alpha fade animation between representative image 342 depicted in frame 360(0) and representative image 342 depicted in frame 360(N+4). Another alternative transition effect animates representative image 342 depicted in frame 360(0) collapsing to a dot and re-emerging as representative image 342 depicted in frame 360(N+4). These and other in-place transition effects may be implemented without departing the scope and spirit of the present invention.

In one embodiment, frames 360 are rendered by a graphics processing unit (GPU) within processor complex 210 of FIG. 2B.

While the techniques disclosed herein are described in conjunction with a mobile device, persons skilled in the art will recognize that any compute platform may be configured to perform these techniques.

While the foregoing is directed to embodiments of the present invention, other and further embodiments of the invention may be devised without departing from the basic scope thereof, and the scope thereof is determined by the claims that follow.

We claim:

1. A method, comprising:
 displaying, on a display unit, two or more representative images within a collection viewer, wherein each one of the two or more representative images is displayed at a respective location relative to a physical origin for the display unit;
 determining a physical rotation of the display unit;
 when the physical rotation surpasses a predetermined angular threshold, receiving an indication of a new orientation for the collection viewer that corresponds to a finer rotation granularity than orthogonal angles of the respective location relative to the physical origin, and when the physical rotation does not surpass the predetermined angular threshold, applying a hysteresis to the indication of the new orientation; and in response to the indication of the new orientation, displaying a sequence of animation frames that depict an in-place rotation animation for each of the two or more representative images, wherein each in-place rotation animation is displayed at the respective location relative to the physical origin for the display unit and each in-place rotation animation is timed independently of the physical rotation of the display unit, and wherein each animation frame in the sequence of animation frames depicts a different rotation angle in a sequence of rotation angles for the two or more representative images by:
 generating the different rotation angle for each animation frame in the sequence of animation frames; and
 displaying a rendered representative image for each of the two or more representative images at the respective location relative to the physical origin for the display unit, wherein each rendered representative image is rotated according to the different rotation angle, wherein a first timing is associated with the in-place rotation animation and a second timing is associated with a physical rotation timing, and the first timing commences after the second timing commences.

2. The method of claim 1, wherein the indication comprises a message in an object-based message passing system.

3. The method of claim 1, wherein the predetermined angular threshold is based on a physical force associated with a mobile computing device.

4. The method of claim 1, wherein displaying the two or more representative images comprises identifying representative images that are visible within the collection viewer.

5. The method of claim 1, wherein the respective location for each of the two or more representative images is determined in one or more animation frames of the sequence of animation frames according to a current scroll position.

6. The method of claim 1, wherein displaying the sequence of rotation angles is performed by a graphics processing unit within a mobile computing device.

7. The method of claim 1, wherein the first timing associated with each in-place rotation animation is based, at least in part, on tracking a physical rotation associated with the new orientation for the collection viewer.

8. The method of claim 1, wherein each in-place rotation animation starts with a first frame of the sequence of animation frames and ends with a last frame of the sequence of animation frames, wherein the last frame corresponds to the new orientation for the collection viewer.

9. The method of claim 1, wherein the in-place rotation animation for each of the two or more representative images completes the respective rotation angle in the sequence of rotation angles within a specified maximum number of frame times.

10. The method of claim 1, wherein the in-place rotation animation for each of the two or more representative images occurs synchronously with respect to the in-place rotation animations of other representative images of the two or more representative images.

11. The method of claim 1, wherein a placement of the rendered representative image for each of the two or more representative images is consistent with a placement of the two or more representative images.

12. The method of claim 1, wherein the new orientation is based on rotating the display unit from at least one of a landscape orientation to a portrait orientation, the portrait orientation to the landscape orientation, or a combination of the landscape orientation to the portrait orientation and the portrait orientation to the landscape orientation.

13. The method of claim 1, wherein a third timing of the sequence of animation frames is based on a timing of a physical rotation.

14. A computer program product embodied in a non-transitory computer-readable medium that, when executed by a processor, causes the processor to perform a method comprising:
displaying, on a display unit, two or more representative images within a collection viewer, wherein each one of the two or more representative images is displayed at a respective location relative to a physical origin for the display unit;
determining a physical rotation of the display unit;
when the physical rotation surpasses a predetermined angular threshold, receiving an indication of a new orientation for the collection viewer that corresponds to a finer rotation granularity than orthogonal angles of the respective location relative to the physical origin, and when the physical rotation does not surpass the predetermined angular threshold, applying a hysteresis to the indication of the new orientation; and in response to the indication of the new orientation, displaying a sequence of animation frames that depict an in-place rotation animation for each of the two or more representative images, wherein each in-place rotation animation is displayed at the respective location relative to the physical origin for the display unit and each in-place rotation animation is timed independently of the physical rotation of the display unit, and wherein each animation frame in the sequence of animation frames depicts a different rotation angle in a sequence of rotation angles for the two or more representative images by:
generating the different rotation angle for each animation frame in the sequence of animation frames; and
displaying a rendered representative image for each of the two or more representative images at the respective location relative to the physical origin for the display unit, wherein each rendered representative image is rotated according to the different rotation angle;
wherein a first timing is associated with the in-place rotation animation and a second timing is associated with a physical rotation timing, and the first timing commences after the second timing commences.

15. The computer program product of claim 14, wherein the indication comprises a message in an object-based message passing system.

16. The computer program product of claim 14, wherein the indication is generated in response to a measurement of a physical force associated with a mobile computing device.

17. The computer program product of claim 14, wherein displaying the two or more representative images comprises identifying representative images that are visible within the collection viewer.

18. The computer program product of claim 14, wherein the respective location for each of the two or more representative images is determined in one or more animation frames of the sequence of animation frames according to a current scroll position.

19. The computer program product of claim 14, wherein displaying the sequence of rotation angles is performed by a graphics processing unit within a mobile computing device.

20. A mobile computing device comprising:
a display unit configured to display a collection viewer; and
a processing unit in communication with the display unit and configured to:
display two or more representative images within the collection viewer, wherein each one of the two or more representative images is displayed at a respective location relative to a physical origin for the display unit;
determine a physical rotation of the display unit;
when the physical rotation surpasses a predetermined angular threshold, receive an indication of a new orientation for the collection viewer that corresponds to a liner rotation granularity than orthogonal angles of the respective location relative to the physical origin, and when the physical rotation does not surpass the predetermined angular threshold, apply a hysteresis to the indication of the new orientation; and
in response to the indication of the new orientation, display a sequence of animation frames that depict an in-place rotation animation for each of the two or more representative images, wherein each in-place rotation animation is displayed at the respective location relative to the physical origin for the display unit and each in-place rotation animation is timed independently of the physical rotation of the display unit, and wherein each animation frame in the sequence of animation frames depicts a different rotation angle in a sequence of rotation angles for the two or more representative images by:
generating the different rotation angle for each animation frame in the sequence of animation frames; and
displaying a rendered representative image for each of the two or more representative images at the respective location relative to the physical origin for the display unit, wherein each rendered representative image is rotated according to the different rotation angle;
wherein a first timing is associated with the in-place rotation animation and a second timing is associated with a physical rotation timing, and the first timing commences after the second timing commences.

* * * * *

UNITED STATES PATENT AND TRADEMARK OFFICE
CERTIFICATE OF CORRECTION

PATENT NO. : 10,810,781 B2
APPLICATION NO. : 16/147206
DATED : October 20, 2020
INVENTOR(S) : Adam Barry Feder et al.

It is certified that error appears in the above-identified patent and that said Letters Patent is hereby corrected as shown below:

In the Claims

Column 12, Line 24 please replace "liner" with --finer--.

Signed and Sealed this
Eighteenth Day of May, 2021

Drew Hirshfeld
*Performing the Functions and Duties of the*
*Under Secretary of Commerce for Intellectual Property and*
*Director of the United States Patent and Trademark Office*